April 27, 1965 A. L. FREEDMAN 3,181,129
DIGITAL INFORMATION STORAGE SYSTEMS
Filed June 6, 1960
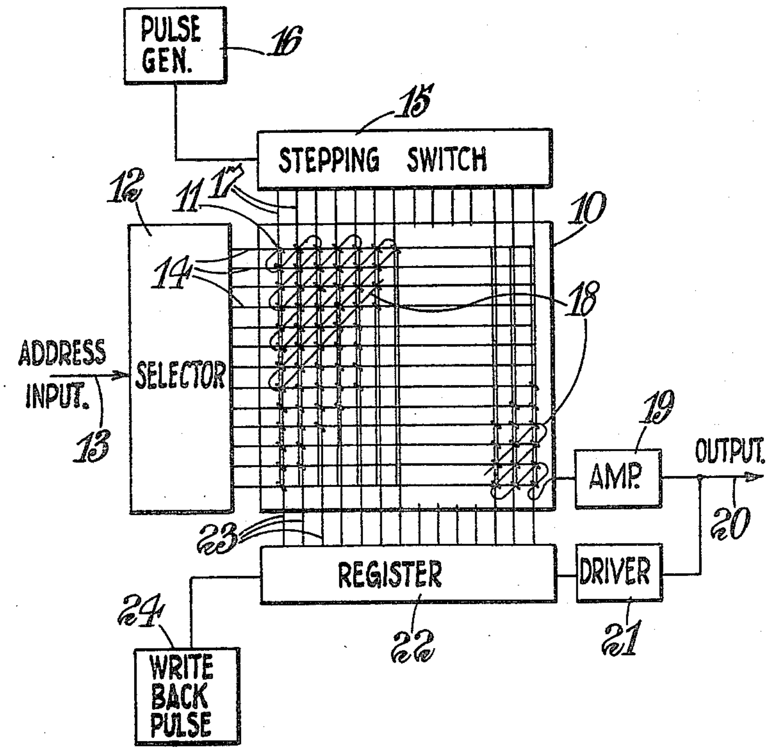

United States Patent Office 3,181,129
Patented Apr. 27, 1965

3,181,129
DIGITAL INFORMATION STORAGE SYSTEMS

Arye Leib Freedman, London, England, assignor to Decca Limited, London, England, a British company Filed June 6, 1960, Ser. No. 34,121
Claims priority, application Great Britain, June 16, 1959, 20,657/59
8 Claims. (Cl. 340—174)

This invention relates to digital information storage systems of the kind comprising an array of storage elements which can be activated by coincident signals to produce an output pulse dependent on the signal stored on the elements. The storage elements may be of the type in which the information is destroyed by the production of the output pulse or they may be of the type in which the information remains stored in the element until subsequently removed. Such storage systems may be used, for example, in a binary digital computer to store multi-digit words.

The storage elements might for example be magnetic cores of the square hysteresis loop type, for example cores of ferrite material. Such magnetic cores can be set in one or other two states, corresponding to two different directions of magnetisation and these two states can represent the two possible units of information in a binary digital system.

In the following description use will be made of the expressions "half pulses" and "full pulses." By a half pulse is meant a pulse which, when applied to a core or other similar storage element is not sufficient to switch the element to the opposite state, assuming the pulse is in the appropriate direction, but which is sufficient, if another half pulse is applied simultaneously, to effect such switching. In the case of a magnetic core, the absolute magnitudes of such current pulses will depend, inter alia, on the number of turns in the windings to which the pulses are applied and the magnetic characteristics of the core. It will also be appreciated that the two half pulses required for switching need not be of identical amplitude provided their combined effect on the core is such that they can switch the core whereas individually they cannot. By a full pulse is meant a pulse which, when applied to a winding on a core, is sufficient to switch the core, assuming the pulse is in the appropriate direction, and, by so switching the core, to induce an output current pulse in an output winding on the core, this output pulse however being of such amplitude that it can be passed through similar output windings on similar cores without switching those cores. Thus a full pulse is a pulse which can be used for reading out of one core on to a common output circuit having series-connected windings on a number of separate cores, the output pulse being induced in one output winding and passing through the other windings in the output circuit without affecting the cores to which full pulses are not applied. It will be appreciated that it is readily possible to prevent the undesired switching of cores, due to passage of current through their output windings on the switching of another core merely by ensuring that there is sufficient impedance in the circuit to reduce the current flow below the value required for switching the cores. Although a full pulse has been defined more particularly by reference to a magnetic core it is to be understood the definition of a full pulse is equally applicable to other types of storage elements.

It is well known to arrange storage elements such as magnetic cores in a matrix. For example cores may be arranged in rows and columns in a number of parallel planes. A selector system for selecting a particular word effectively applies a full pulse to a the cores in the selected word. This is sometimes done by applying a full pulse to the required cores and sometimes by applying half pulses to the cores of one group of words and half pulses to the cores of another group of words so chosen that the desired word is the only word common to both groups. This effertive full pulse switches the cores to one particular state, e.g. corresponding to an 0, so that the cores of the selected word, if they are in the other state, e.g. corresponding to a 1, are switched to give read-out pulses which are amplified separately by separate amplifiers and then fed into a register or other device for temporarily holding the information. The cores in the first state, e.g. corresponding to an 0, are not switched and hence the register will be set to correspond to the selected word. The information thus put in parallel form into the register may then be read off serially to give an output in serial form as is often required for operating output devices.

According to this invention, in a digital storage system of the kind comprising an array of storage elements which can be activated by coincident signals to produce an output pulse dependent on the signal stored on the element, there are provided selector means to apply effectively half pulses simultaneously to all the storage elements carrying a selected word, a read-out circuit coupled to all the elements, and means for applying half pulses in succession to the various elements in each word whereby signals corresponding to the selected word are fed serially to said read-out circuit.

If the storage elements are of the kind in which the reading out of the information from an element destroys the stored information, there may be provided means for writing back the read-out information onto a set of further storage elements corresponding to the separate digits of the word, circuit means linking these further elements with the corresponding digit elements of said array, and means for subsequently activating said further storage elements simultaneously to write back the information stored therein on to the storage elements representing the selected word in said array. This arrangement enables the information stored in the array of elements to be read-out directly in serial form using only one read-out circuit. In general it is necessary that the signals be amplified but it is not necessary to have separate amplifiers for each digit in the word. In many cases, the read-out circuit may be a single circuit linking all the elements of the array but in some cases a number of separate circuits (small compared with the number of digits in a word) may have to be used, the outputs from these separate circuits, after amplification being fed to a common output circuit.

The aforementioned means for applying half pulses in succession to the various elements in each word may comprise a stepping switch or a pulse separator, that is to say a device providing a succession of pulses on separate output lines.

The writing back may be effected by applying the signals on said read-out circuit, after amplification, as half pulses to all the elements of said set of further storage elements, and by applying half pulses from said stepping switch or pulse separator to these further storage elements in succession whereby the various output signals corresponding to different digits of the word are written into appropriate separate storage elements which thus correspond to the separate digits of the word. The writing back is done in parallel thereby minimizing the time required for write-back. In general the same stepping switch or pulse selector would be employed both for read-out from the array and for switching said further storage elements forming the write-back store but a separate stepping switch or pulse separator may be employed if so desired.

For writing back the information into the array, the word selector for the array may be arranged to provide a full pulse on one wire selecting the elements of the array on to which the information is to be written and the output from said further storage elements of the write-back system may be applied as inhibiting signals to the elements of the array corresponding to digits where no change of state is required. In another arrangement the word selector is arranged to apply half pulses to the elements in the array selected to carry the required word and said further storage elements carrying the write-back information may be switched to provide half pulses for switching the appropriate elements of the array. Instead of using a half pulse from the word selector in this latter case, a full pulse may be employed with a biasing half pulse in the opposite direction. It will be understood that the use of such a full pulse with a biasing pulse may be more convenient in some cases, for example if the storage elements of the array are arranged in a three dimensional matrix as then conveniently half pulses are applied in two separate planes to select the required word so that the elements of the selected word would thus have a full pulse whilst the non-selected elements would have no pulse or only a half pulse applied.

As previously indicated the elements of the array may be magnetic elements, for example ferrite cores having a square hysteresis loop, or they may be capacitive elements with diodes.

The following is a description of one embodiment of the invention reference being made to the accompanying drawing which is a diagrammatic illustration of a digital data storage system.

Referring to the drawing there is shown a matrix 10 of storage elements which in this embodiment are magnetic cores. The various storage elements some of which are indicated at 11 may be arranged in a two-dimensional or in a three-dimensional matrix but for convenience in illustration there is shown a two-dimensional matrix in which each of the various words are written on a series of elements extending horizontally in the figure. The required word is selected by an address selector 12 to which an address input is supplied through an input circuit 13 and which selects the particular word in the matrix by energising the appropriate one of a number of word selector circuits 14. In the simplest case, for a two-dimensional matrix, the word selector 12 is arranged to apply half pulses to all the storage elements 11 in the selected word. When it is required to read-out a word, a stepping switch or pulse separator 15 is energised by a suitable pulse generator 16 to produce a series of pulses in succession on separate leads 17 which are coupled to the various successive cores of each word, that is to say the first pulse to be produced by the stepping switch would be coupled to all the cores of the various words holding the first digit of a word and the second pulse to the cores holding the second digit and so on. The pulses from the stepping switch 15 are of such magnitude that they constitute half pulses as hereinbefore defined so that only the core elements in the word selected by the selector 12 will be switched. The various core elements are all coupled to a common read-out circuit 18 which leads to an amplifier 19. It will thus be seen that the selection of a word by the word selector 12 and the subsequent initiation of operation of the stepping switch 15 will cause the digital information representative of the selected word to be read out in serial form on the read-out circuit 18. The serial information is amplified by the amplifier 19 and then fed to an output circuit 20 for subsequent use.

In a magnetic core storage system, such reading out of the information from the cores destroys the information on those cores and, if it is to be retained in the storage system, it must be written back into the store. For this purpose the output from the amplifier 19 is fed through a driver unit 21 to a register 22 which conveniently comprises a series of further magnetic core storage elements similar to the elements 11 in the matrix. The information from the read-out circuit 18 is in serial form and will be fed as such into the register 22 so that, when the read-out is complete, the register 22 will hold the read-out word with the various digits on the appropriate storage elements. Typically cores in the register 22 storing 1's would be switched and cores storing 0's would not be switched. Assuming that cores in the matrix carrying 1's are in a switched condition and cores carrying 0's are in their normal condition, then to write back the information from the register 22 to the matrix, all the switched cores in the register have to be made to switch the appropriate cores in the matrix. The storage elements in the register 22 are coupled by circuits 23 to the corresponding storage elements 11 in the matrix 10. After the read-out is completed, a write-back pulse from a pulse generator 24 is applied to the register 22 and this causes half pulses to be fed simultaneously through all the write-back circuits 23 associated with elements in the register 22 which have been switched so that the information is then written into the particular word in the matrix 10 which has been selected by the selector 12. Normally the selector 12 will be arranged to select a word for read-out and to remain effective to select the word until the write-back of the information has been completed.

It will be seen that by the arrangement described above information is read directly out of a digital data storage matrix in serial form. There is no feeding of the information from a matrix in parallel into a separate register and then reading from the register in serial form as has been the practice heretofore.

If the matrix is a three-dimensional matrix, it may be more convenient for the word selection by the word selector to be effected by separate half pulses in two separate planes so that a full pulse is applied to the selected word. In this case biasing half pulses in the opposite direction may be applied so that the word is only read out when the half pulses from the stepping switch are applied.

For a large matrix, it may be preferable to have two or more circuits for reading out information, each linking some of the cores, these circuits feeding into an "or" gate and thence into a common output circuit. The number of circuits linking the cores would be small compared with the number of digits in a word and such an arrangement operates in exactly the same way as an arrangement with the single circuit 18.

I claim:

1. In a digital storage system of the kind comprising an array of storage elements which can be activated by coincident signals to produce an output pulse dependent on the signal stored on the element and in which reading out of the information from an element destroys the stored information, the combination of
   (*a*) selector means to apply half pulses simultaneously to all the storage elements carrying a selected word,
   (*b*) a read-out circuit coupled to all the storage elements,
   (*c*) means for applying half pulses in succession to the various elements in each word whereby signals corresponding to the selected word are fed serially to said read-out circuit,
   (*d*) a set of further storage elements corresponding to the separate digits of a word,
   (*e*) means for writing back the read-out information onto said set of further storage elements,
   (*f*) circuit means linking said further storage elements with the corresponding digit elements of said array, and
   (*g*) means for subsequently activating said further storage element simultaneously to write back in parallel the information stored therein onto the storage elements representing the selected word in said array.

2. A digital storage system comprising
   (*a*) an array of magnetic storage elements of the kind which can be activated by coincident electric signals to produce an output pulse dependent on the signal stored on the element,
   (*b*) selector means to apply effectively half pulses simultaneously to all the storage elements carrying a selected word, (c) a read-out circuit coupled to all the storage elements, (d) means for applying similar half pulses in succession to the various elements in each word to produce serially in said read-out circuit output pulses corresponding to the selected word, (e) a set of further storage elements corresponding to the various digits of a word, (f) means for writing the read-out information onto said further storage elements, (g) circuit means linking each of said further elements with the corresponding digit elements of said array, and (h) means for activating all said further storage elements simultaneously to write back the read-out word in parallel onto the elements representing the selected word in said array.

3. A digital storage system as claimed in claim 1 wherein said means for applying half pulses in succession to the various elements in each word comprises a stepping switch.

4. A digital storage system as claimed in claim 3 wherein said means for writing back the read-out information onto said further storage elements comprises means for applying the signals on said read-out circuit as half pulses to all the elements of said set of further storage elements, and means for applying half pulses from said stepping switch to these further storage elements in succession whereof the various output signals corresponding to different digits of the word are written into appropriate separate storage elements which thus correspond to the separate digits of the word.

5. A digital storage system as claimed in claim 3 wherein said stepping switch is arranged also for switching said further storage elements forming the write-back store.

6. A digital storage system as claimed in claim 1 wherein, for writing back the information into the array, a word selector for the array is arranged to provide a full pulse on one wire selecting the elements of the array on which the information is to be written and wherein the output from said further storage elements of the write-back system are applied as inhibiting signals to the elements of the array where no change of state is required.

7. A digital storage system as claimed in claim 1 wherein, for writing back the information into the array, a word selector for the array is arranged to apply half pulses to the elements in the array selected to carry the required word and wherein said further storage elements carrying the write-back information are switched to provide half pulses for switching the appropriate elements of the array.

8. A digital storage system as claimed in claim 7 wherein the word selector is arranged to apply a full pulse with a biasing half pulse in the opposite direction to the elements in the array selected to carry the required word.

References Cited by the Examiner

UNITED STATES PATENTS

| | | | |
|---|---|---|---|
| 2,784,391 | 3/57 | Rajchman et al. | 340—174 |
| 2,802,203 | 8/57 | Stuart-Williams | 340—174 |
| 2,840,801 | 6/58 | Beter et al. | 340—174 |
| 2,993,196 | 7/61 | Hughes et al. | 340—172.5 |

IRVING L. SRAGOW, *Primary Examiner.*

EVERETT R. REYNOLDS, *Examiner.*